United States Patent
Pathak et al.

(10) Patent No.: US 12,493,803 B1
(45) Date of Patent: Dec. 9, 2025

(54) OPTIMIZED RETREIVAL USING KNOWLEDGE GRAPH-ENHANCED RETRIEVAL AUGMENTED GENERATION

(71) Applicant: Dell Products L.P., Round Rock, TX (US)

(72) Inventors: Priyanka Pathak, Bengaluru (IN); Saurabh Jha, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/023,664

(22) Filed: Jan. 16, 2025

(51) Int. Cl.
| | |
|---|---|
| G06F 7/00 | (2006.01) |
| G06F 16/334 | (2025.01) |
| G06F 40/289 | (2020.01) |
| G06N 5/022 | (2023.01) |

(52) U.S. Cl.
CPC ......... *G06N 5/022* (2013.01); *G06F 16/3344* (2019.01); *G06F 16/3347* (2019.01); *G06F 40/289* (2020.01)

(58) Field of Classification Search
CPC ............ G06F 16/3347; G06F 16/3344; G06F 16/332; G06F 16/24542; G06F 16/2455; G06F 16/24522; G06F 16/2456; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06F 40/289; G06F 40/10; G06F 40/40; G06F 40/205; G06F 40/105; G06F 40/106; G06F 40/186; G06F 40/211; G06N 5/04; G06N 5/01; G06N 5/022; G06N 20/00; G06N 20/20; G06N 5/018
See application file for complete search history.

(56) References Cited

U.S. PATENT DOCUMENTS

| | | | |
|---|---|---|---|
| 12,277,246 B1 * | 4/2025 | Manton | G06F 21/6209 |
| 2024/0134865 A1 * | 4/2024 | Bierner | G06F 40/30 |
| 2025/0061140 A1 * | 2/2025 | Levinson | G06F 40/30 |
| 2025/0156639 A1 * | 5/2025 | Sinha | G06V 30/416 |
| 2025/0218206 A1 * | 7/2025 | Rosoff | G06V 30/413 |

\* cited by examiner

*Primary Examiner* — Mohammad A Sana
(74) *Attorney, Agent, or Firm* — Chamberlain, Hrdlicka, White, Williams & Aughtry; Aly Z. Dossa

(57) ABSTRACT

A method for managing user queries applied to a large language model (LLM) includes obtaining a user query and in response to obtaining the user query: identifying a state of the user query, wherein the state is based on whether the user query is associated with a previous user query, making a determination, based on the state, that the user query indicates an enhanced context generation, in response to the determination, performing a semantic search on a vectorized database to obtain a set of relevant documents, performing an enhanced search on the set of relevant documents using a knowledge graph to obtain enhanced context, embedding the enhanced context to the user query to obtain a finalized prompt, and applying the finalized prompt to a large language model (LLM) of the data system to obtain a finalized result, and providing the finalized result to the client device.

20 Claims, 7 Drawing Sheets

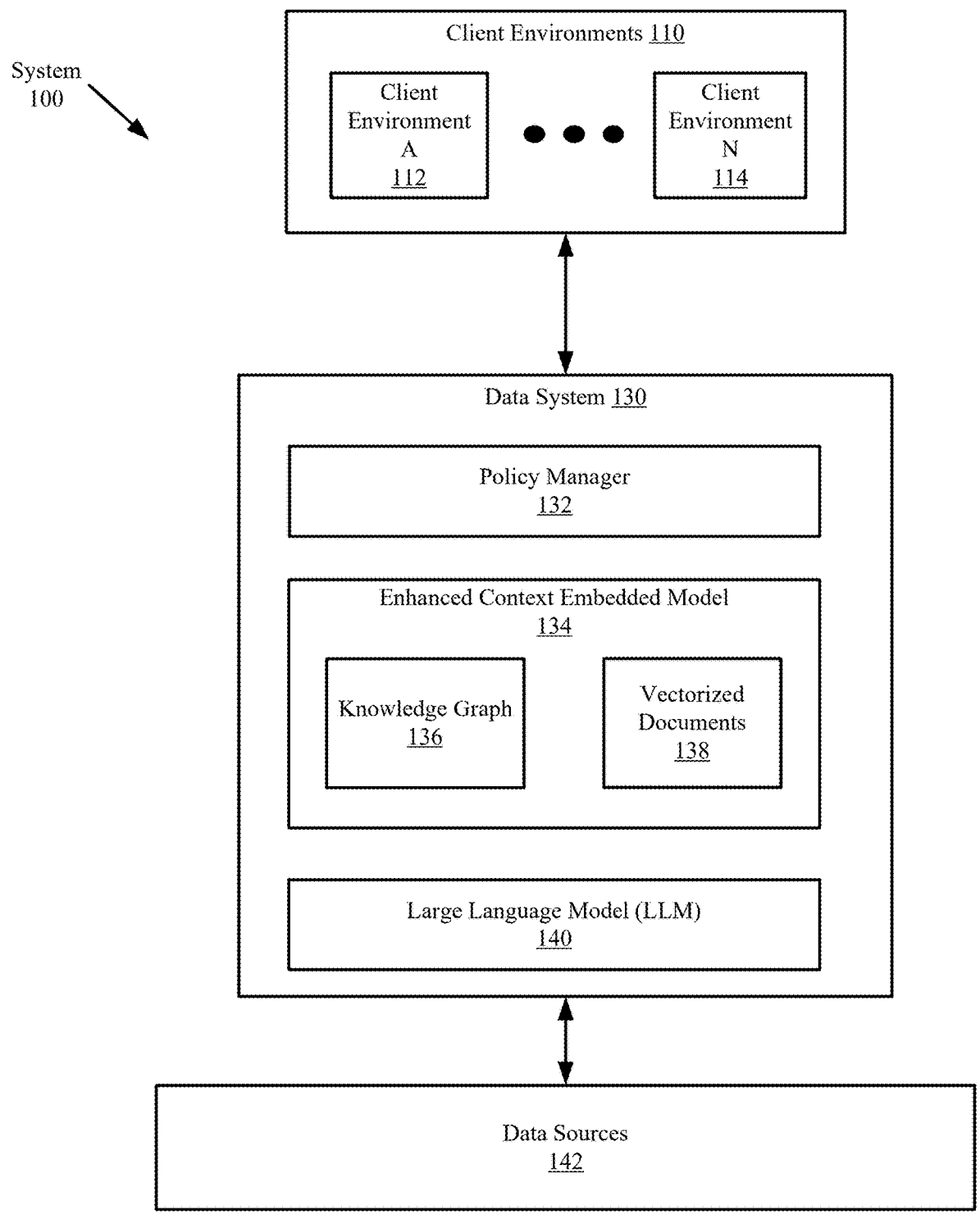
FIG. 1.1

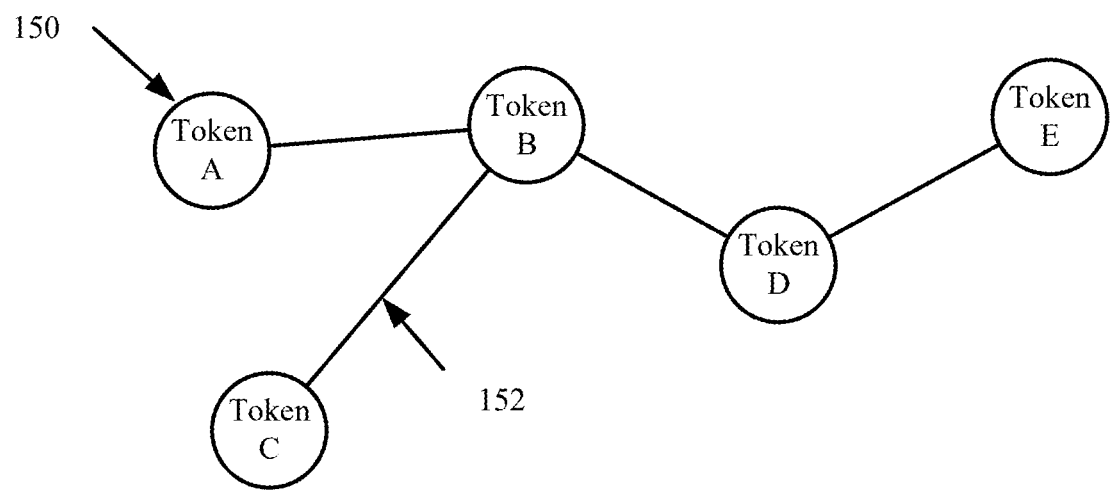
FIG. 1.2

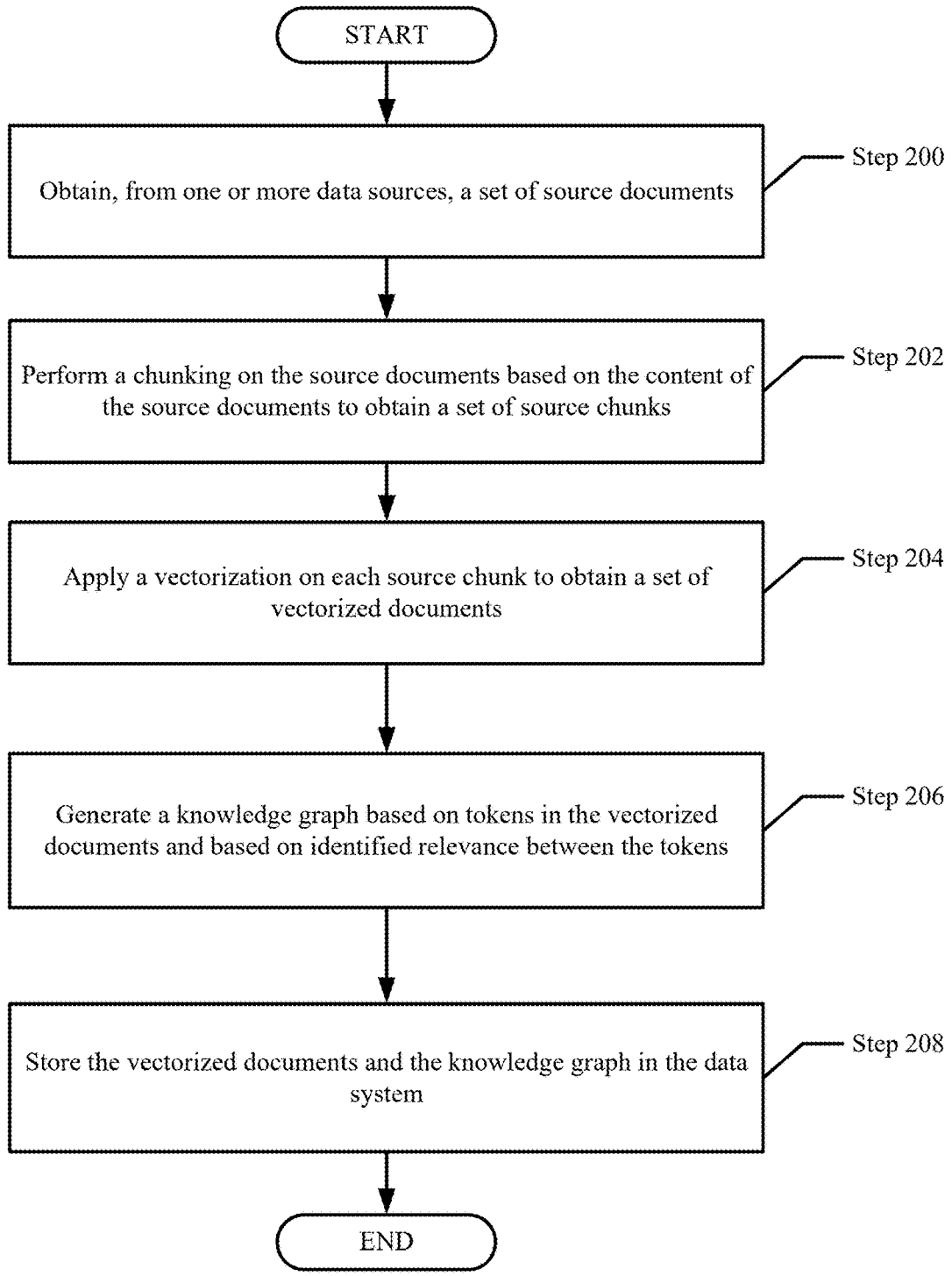
FIG. 2.1

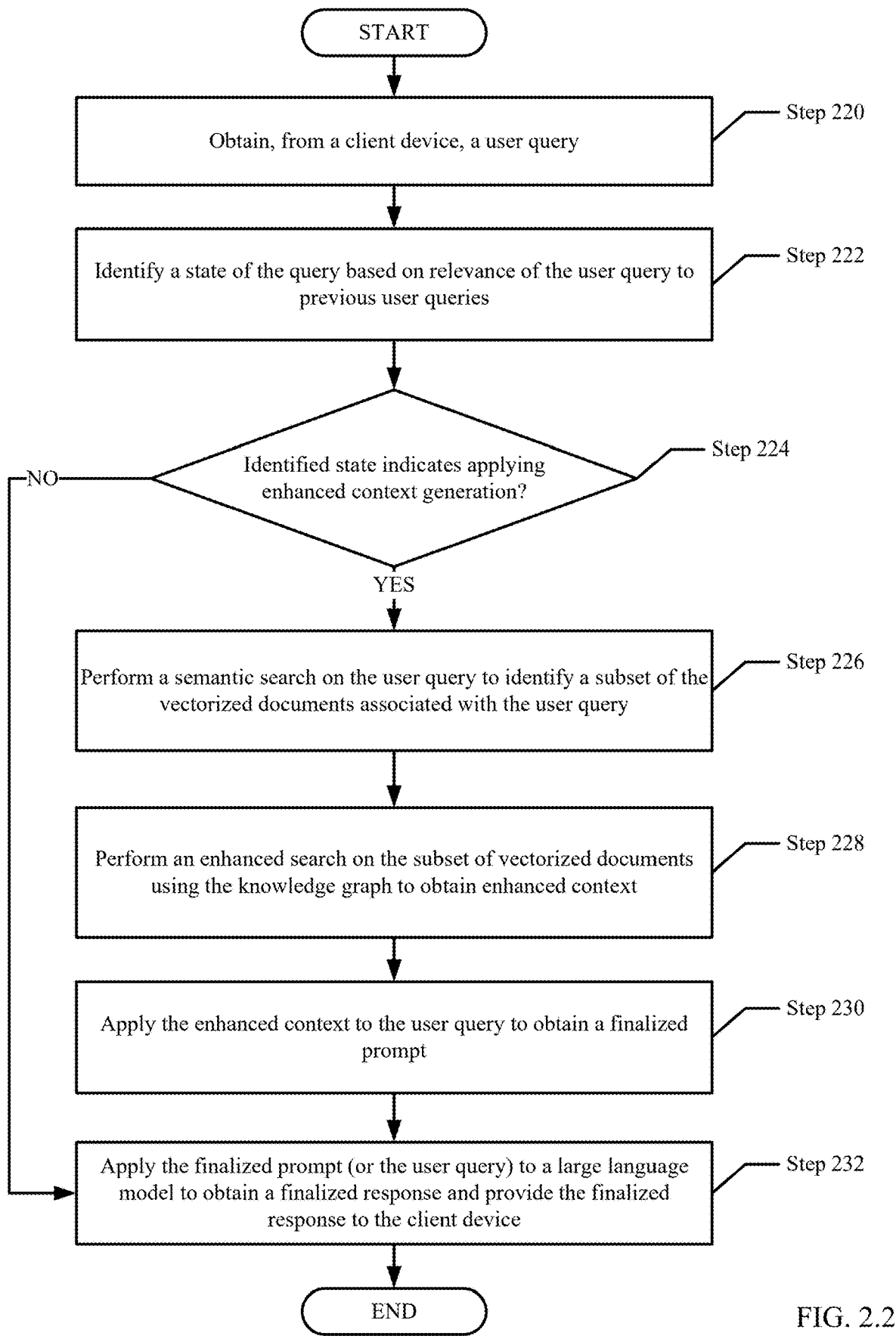
FIG. 2.2

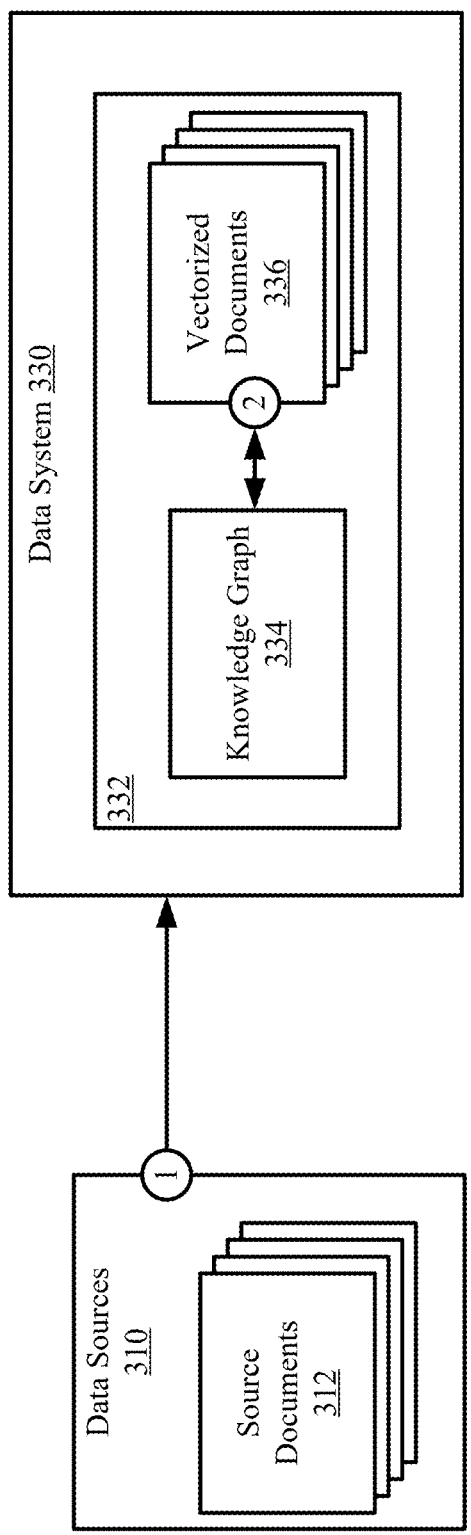
FIG. 3.1

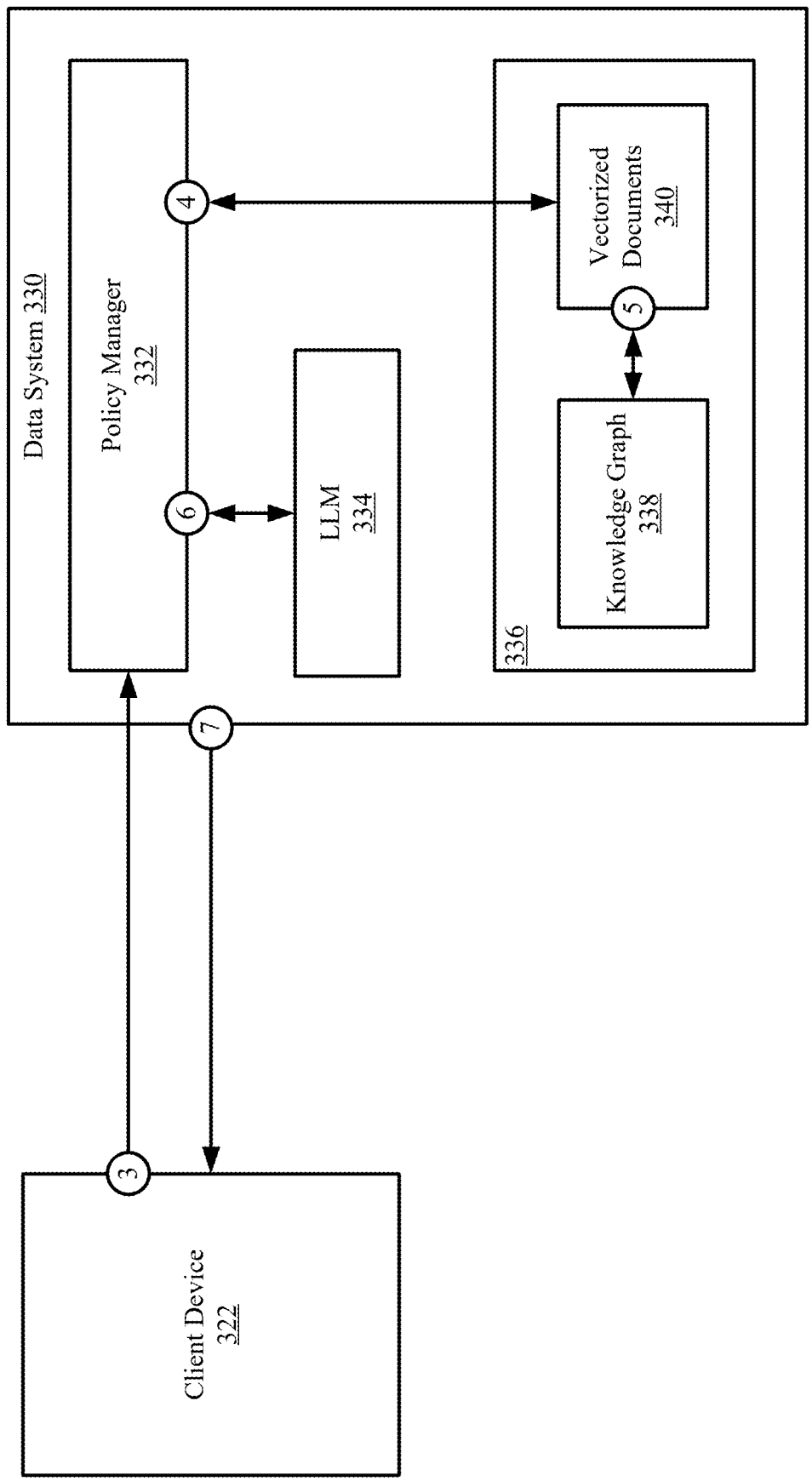
FIG. 3.2

US 12,493,803 B1

OPTIMIZED RETREIVAL USING KNOWLEDGE GRAPH-ENHANCED RETRIEVAL AUGMENTED GENERATION

BACKGROUND

Large language models (LLM) may be used for evaluation of data such as transcripts of previous meetings. The evaluation of the data by, for example, a user, may be used for decision-making of future opportunities. LLMs may be limited in their analysis of nuanced concepts like emotion in the transcripts.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a knowledge graph in accordance with one or more embodiments of the invention.

FIG. 2.1 shows a flowchart of a method for generating an enhanced context embedded model in accordance with one or more embodiments of the invention.

FIG. 2.2 shows a flowchart of a method for servicing user queries in accordance with one or more embodiments of the invention.

FIGS. 3.1-3.2 show an example in accordance with one or more embodiments of the invention.

DETAILED DESCRIPTION

Figure 4:
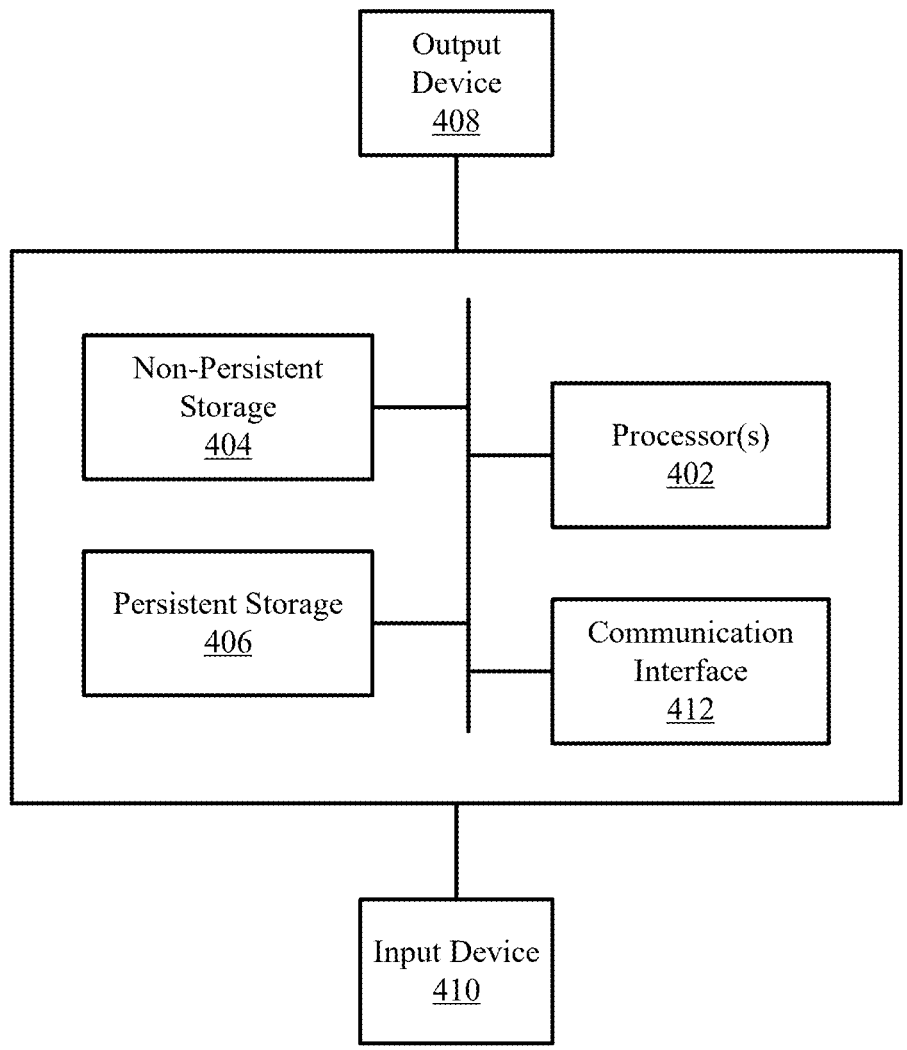
FIG. 4 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments of the invention include systems and methods for managing transcripts and other documents after a meeting for evaluation using a retrieval augmented generation (RAG) model. Embodiments of the invention include, for example, a system of a large language model (LLM) that obtains a generated input processed using a RAG model to retrieve relevant information and embedded data to a prompt using the retrieved information, and applying the prompt to the LLM to obtain an output that specifies accurate responses.

Various embodiments of the invention are described below.

FIG. 1.1 shows a system in accordance with one or more embodiments of the invention. The system (100) includes any number of client environments (110), a data system (130), and any number of data sources (142). The overall system (100) may include additional, fewer, and/or different components without departing from the scope of the invention. Each component may be operably connected to any of the other component via any combination of wired and/or wireless connections. Each component illustrated in FIG. 1.1 is discussed below.

In one or more embodiments, each client environment (112, 114) is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the client environment (112, 114) described throughout this present disclosure.

In one or more embodiments of the invention, each client environment (112, 114) is implemented as a logical device. A logical device may utilize the computing resources of any number of computing devices (refer to FIG. 4) to provide the functionality of the client environment (112, 114) described throughout this present disclosure.

In one or more embodiments, each client environment (112, 114) represents an organization (e.g., an enterprise) that includes any number of users managing data online using the data system (130). The users may access the data via computing devices of the respective client environments (112, 114).

In one or more embodiments, a client device of any client environment (112, 114) may issue user queries to the data system (130). A user query may refer to a question, initiated by a user of the client environments (110), that requests information associated with a use case. An example use case may be, for example, an earnings call. The data system (130) may perform the method of FIG. 2.2 to service such user queries.

In one or more embodiments, the client environments (110) further include functionality for generating source documents stored in the data sources (142). The source documents may be processed by the data system (130) in accordance with the method of FIG. 2.1.

In one or more embodiments, the data system (130) provides the functionality for: (i) obtaining user queries for data in the data sources (142) in a natural language, (ii) processing the user query using an enhanced context embedded model (134), and (iii) providing a response in the natural language. To perform the aforementioned functionality, the data system (130) includes a policy manager (132), the enhanced context embedded model (134), and a large language model (140). The data system may include additional, fewer, and/or different components without departing from the invention.

In one or more embodiments, the policy manager (132) includes functionality for obtaining user queries from the client environments (110) and identifying a state of each user query. The state of a user query may determine whether enhanced context (discussed in FIG. 2.2) is to be generated for the given user query.

In one or more embodiments, the enhanced context embedded model (134) is a data structure that segregates and embeds source documents obtained from the source documents (142) based on the content of the source documents. The enhanced context embedded model (134) includes a knowledge graph (136) and a set of vectorized documents (138). In one or more embodiments, the vectorized documents (138) may be a collection of chunked and processed portions of source documents obtained from the data sources (142). Each vectorized document may be associated with a portion (e.g., a paragraph) of a source document and embedded with additional metadata such as concepts, intent, emotion, and/or other additional information that is used during semantic search as discussed in FIG. 2.2. The vectorized documents (138) may further be collectively referred to as a vectorized database. For additional details regarding the knowledge graph (136), refer to FIG. 1.2.

In one or more embodiments, the LLM (140) is a machine learning model that obtains inputs that include: (i) user queries written in a natural language and (ii) one or more of the vectorized documents (138) collected as an enhanced context of a corresponding user query. The LLM (140) may output a response to the user query, using the content of the inputted one or more vectorized documents (138). The output may be in a natural language. The LLM (140) may be implemented using any machine learning algorithm (e.g., convolutional neural network (CNN), generative AI, etc.) without departing from the invention.

In one or more embodiments, the data system (130) (and/or each component illustrated within) is implemented as a computing device (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data system (130) (and/or each component illustrated within) described throughout this present disclosure including the methods of FIGS. 2.1 and 2.2.

Alternatively, in one or more embodiments of the invention, the data system (130) (and/or each component illustrated within) is implemented as a logical device. A logical device may utilize the computing resources of any number of computing devices to provide the functionality of the data system (130) (and/or each component illustrated within) described throughout this present disclosure including the methods of FIGS. 2.1 and 2.2.

FIG. 1.2 shows a diagram of a knowledge graph in accordance with one or more embodiments of the invention. The knowledge graph may be an embodiment of a knowledge graph (136) discussed above. The knowledge graph may include any number of tokens (e.g., 150) and a relevance value between each pair of tokens. The relevance value of a pair of tokens may be used to represent relationships (e.g., 152) between the pair. The relationships between tokens may be represented in FIG. 1.2 using lines connecting a pair of tokens. Each token may represent a concept obtained from the vectorized documents (138). Example concepts associated with one of the tokens include, for example, entities such as people or an enterprise, an emotion, a topic, a datum point, or any other concepts without departing from the invention. For example, as illustrated in FIG. 1.2, token B may be deemed relevant to token C, and as such, a relationship may be represented between token B and token C.

In one or more embodiments, the knowledge graph illustrated in FIG. 1.2 is an exemplary knowledge graph of a knowledge graph (136, FIG. 1.1) discussed throughout the present disclosure. In one or more embodiments, the knowledge graph (136) is used for an enhanced search by identifying tokens in a set of vectorized documents (136, FIG. 1.1) and the corresponding relationships to other tokens to identify, for example, additional vectorized documents that may be relevant for the enhanced search, as discussed in FIG. 2.2.

FIG. 2.1 shows a flowchart of a method for updating a set of vectorized documents in accordance with one or more embodiments of the invention. The method shown in FIG. 2.1 may be performed by, for example, a data system (130, FIG. 1.1). Other components of the system illustrated in FIG. 1.1 may perform the method of FIG. 2.1 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 200, a set of source documents are obtained from one or more data sources (142, FIG. 1.1). In one or more embodiments, the source documents may be associated with a use case associated with one or more embodiments of the invention. For example, if the use case is evaluation of an earnings call by investors or by enterprises presenting the information of the earnings call. In such use case, the source documents may include an earnings call transcript, one or more graphs or tables that specify data of the earnings, a question and answer (Q&A) portion of the earnings call, web pages obtained from the Internet, and/or any other information without departing from the invention. The one or more source documents may be selected, for example, by an administrator of the data system.

In step 202, a chunking is performed on the source documents based on the content of the source documents to obtain a set of source chunks. In one or more embodiments, the chunking includes identifying separation points of each source documents to partition each source document into the source chunks. The separation points may be identified using, for example, paragraph separations of the source documents.

In step 204, a vectorization is applied on each source chunk to obtain a set of vectorized documents. In one or more embodiments, the vectorization includes embedding each source chunk with metadata, or other information, that may be used for semantic search while servicing a user query in accordance with FIG. 2.2.

In step 206, a knowledge graph is generated based on a set of tokens in the vectorized documents and based on identified relevance between the tokens. In one or more embodiments, the knowledge graph is generated by identifying multiple tokens each associated with an entity or with a concept specified in the source documents and embedding, for each token generated, a relevancy value between the token and other tokens based on their use in the source documents. Further, relationships between pairs of tokens may be established in the knowledge graph based on their corresponding relevancy values. In this manner, the knowledge graph establishes any relationships between tokens that may not be captured by the vectorized documents alone.

In step 208, the vectorized documents and the knowledge graph are stored in the data system.

FIG. 2.2 shows a flowchart of a method for applying a KG-enhanced retrieval augmented generation of prompts to LLMs in accordance with one or more embodiments of the invention. The method shown in FIG. 2.1 may be performed by, for example, a data system (130, FIG. 1.1). Other components of the system illustrated in FIG. 1.1 may perform the method of FIG. 2.1 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 2.2, in step 220, a user query is obtained from a client device. The user query may include a request to obtain information from the LLM and is associated with one or more source documents converted to vectorized documents (138, FIG. 1.1).

In step 222, a state of the query is identified based on a relevance of the user query to previous user queries. In one or more embodiments, the state of the query is identified by calculating the relationship between the user query and either: (i) previously-sent user queries, or (ii) previous enhanced context (discussed below) used to embed previous user queries. The state may be an indication about whether the user query is highly related (as deemed by a policy manager (132, FIG. 1.1) of the data system) to any of the previous information used for previous user queries. For example, the query may be identified as an "old" state if the user query is deemed highly related to at least one or more previous user queries or enhanced context. Conversely, the query may be identified as a "new" state if the user query is not deemed related to any previous queries or enhanced context.

In step 224, a determination is made about whether the identified state indicates applying enhanced context generation for the user query. The determination may be based on whether the state indicates that the user query is highly related to any previous user queries or previous enhanced context. If an enhanced context generation is indicated by the state of the user query, the method proceeds to step 226; otherwise, the user query is deemed the finalized prompt, and the method proceeds to step 232.

In step 226, a semantic search is performed on the user query to identify a subset of the vectorized documents associated with the user query. In one or more embodiments, the semantic search includes vectorizing the user query by embedding high dimensional mathematical representations of the text and any implied meanings of the text in the user query. A k-nearest neighbors (kNN) algorithm may be applied to the vectorized user query and a vectorized database to identify the subset of the vectorized documents that are each most related to the vectorized representation of the text based on their respective vectorized embeddings. In this manner, a k-shot prompting is applied such that each vectorized document in the identified subset is deemed to meet a threshold of relevance to the vectorized user query based on the semantic search. For example, the subset of vectorized documents may be ranked using a cosine similarity based on the k-shot prompting.

In step 228, an enhanced search is performed on the subset of vectorized documents using the knowledge graph to obtain enhanced context. In one or more embodiments, the knowledge graph is used to identify additional context between the user query and one or more vectorized documents. For example, the user query may include with one or more concepts corresponding to tokens of the knowledge graph. The tokens of the corresponding concepts may be associated with one or more other tokens in the knowledge graphs via relationships. The other tokens may be associated with one or more additional vectorized documents in the vectorized database. The enhanced search may include identifying the other tokens corresponding to the concepts included in the user query via the relationships between tokens as indicated in the knowledge graph, and identifying additional vectorized documents to update the subset of vectorized documents. The updated subset of vectorized documents may be used to generate the enhanced context. The enhanced context may include the updated subset of vectorized documents and/or any additional context that relates each of the subset of vectorized documents to the user query. For example, the additional context may include structured entity information combining the entity textual description of each token and its many properties and relationships. By including the additional context in the enhanced context, embodiments of the invention encourages deeper insights facilitated by the LLM.

In step 230, the enhanced context is applied to the user query to obtain a finalized prompt. In one or more embodiments, the enhanced context is applied by embedding the enhanced context to the user query such that, collectively, the user query and enhanced context are applied to the LLM as the finalized prompt.

In step 232, the finalized prompt is applied to a large language model (LLM) to obtain a finalized response. In one or more embodiments, the LLM is applied to the finalized prompt (which may be simply the user query or the user query embedded with the enhanced context) to generate the finalized response. The finalized response is provided to the client device.

Example

FIGS. 4.1-4.2 show a diagram of an example system in accordance with one or more embodiments of the invention. Any actions and/or interactions between components in the example system are illustrated in FIGS. 4.1-4.2 as circled numbers and described below using bracketed numbers (e.g., "[1]").

The example system includes a data system (330) that is used for processing information associated with an earnings call presented to investors for an enterprise. The data system (330) obtains source documents (312) associated with the earnings call from data sources (310) [1]. In this example, the source documents (312) include a transcript of the earnings call meeting, a set of presentations such as tables and slideshows presented during the call, and a Q&A portion of the meeting between the investors present and the presenters of the earnings representing the enterprise. The data sources (310) are any entities external to the data system (330) that provide the source documents (312).

In response to obtaining the source documents (312) the data system generates an enhanced context embedded model (332) that includes a set of vectorized documents (336) and a knowledge graph (334) [2]. In this example, the set of vectorized documents (336) and the knowledge graph (334) are generated in accordance with the method of FIG. 2.1. Specifically, the vectorized documents (336) are generated by partitioning the source documents (312) by paragraphs or by based on the content of the information in the source documents (312) and embedding additional information to the vectorized documents to be used for semantic search. The knowledge graph (334) is generated by identifying tokens such as entities (e.g., individuals mentioned in the source documents), concepts such as profit, loss, timelines, and/or any other concepts, and a relevance value associated with each pair of tokens. The generated vectorized documents (336) and knowledge graph (334) are used for query management in accordance with FIG. 3.2.

Turning to FIG. 3.2, the example system further includes a client device (322) that is operated by an employee of the enterprise that would like to evaluate the information generated during the earnings call and processed as vectorized documents (336).

The client device (322) issues a user query that requests a sell-side market estimate associated with the earnings call [3]. A policy manager (340) of the data system (330) performs the method of FIG. 3.2 to identify a state of the user query. The user query in this example is deemed a "new" state, so it is determined that an enhanced context generation is to be applied to the user query. To perform the enhanced context generation, the policy manager (340) performs a vectorization on the user query in accordance with the method of FIG. 2.2 and performs a semantic search using the vectorized documents (336) to identify a subset of vectorized documents [4]. An enhanced search is further performed on the subset of vectorized documents (336) using the knowledge graph (334) and also in accordance with FIG. 2.2 [5]. Based on the semantic search and the enhanced search performed on the vectorized user query, the subset of vectorized documents are ranked and provided to the policy manager (340) to obtain the enhanced context. The user query and the enhanced context are collectively referred to as a finalized prompt. The finalized prompt is applied to a large language model (LLM) (342) of the data system (330) to obtain a finalized response [6]. The finalized response is provided to the client device (322) [7].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computer (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the interactions between users using a client device and a data system that provides responses via a large language model (LLM) by determining context associated with any user queries initiated by the user. The additional context improves the outcomes from applying the user query to the LLM. Further, to preserve the computing resources utilized to determine such context, embodiments of the invention include logic for determining whether the enhanced context generation is required. For user queries with existing relevant context applied to related previous user queries, the enhanced context generation may not be performed, thus preserving computing resources.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing user queries, the method comprising:
    obtaining, by a data system and from a client device, a user query;
    in response to obtaining the user query:
        identifying a state of the user query, wherein the state is based on whether the user query is associated with a previous user query;
        making a determination, based on the state, that the user query indicates an enhanced context generation;
        in response to the determination, performing a semantic search on a vectorized database to obtain a set of relevant documents;
        performing an enhanced search on the set of relevant documents using a knowledge graph to obtain enhanced context;
        embedding the enhanced context to the user query to obtain a finalized prompt;
        applying the finalized prompt to a large language model (LLM) of the data system to obtain a finalized result; and
        providing the finalized result to the client device.

2. The method of claim 1, further comprising:
    obtaining, from a data source, a source document;
    performing a chunking on the source document to obtain a set of source chunks;
    applying a vectorization on each of the set of source chunks to obtain a set of vectorized documents, wherein the set of vectorized documents comprise the set of relevant documents; and
    storing the set of vectorized documents in the vectorized database.

3. The method of claim 1, wherein performing the semantic search comprises:
    performing a vectorization of the user query to obtain a vectorized query;
    calculating a relationship value for the vectorized query to each vectorized document in the vectorized database;
    ranking each vectorized document in the vectorized database based on a corresponding relationship value; and
    based on the ranking, identifying the set of relevant documents.

4. The method of claim 1, further comprising:
    obtaining, by the data system and from the client device, a second user query, wherein the second user query is associated with the user query;
    in response to obtaining the second user query:
        identifying a second state of the second user query, wherein the second state indicates that the second user query is associated with the user query;
        making a second determination, based on the second state, that the second user query does not indicate the enhanced context generation;
        based on the second determination, applying the user query to the large language model to obtain a second response; and
        providing the second response to the client device.

5. The method of claim 4,
    wherein the determination and the second determination are made using a policy manager of the data system, and
    wherein the policy manager is updated based on a reinforcement learning associated with the response, the second response, and using feedback obtained from the client device.

6. The method of claim 1, wherein the knowledge graph represents relationships between tokens in the set of relevant documents, and wherein each of the tokens is a concept in the vectorized database.

7. The method of claim 6, wherein the enhanced search comprises:
    identifying a portion of the tokens in the set of relevant documents;
    identifying a relevant token of the knowledge graph related to one token in the portion of the tokens; and
    selecting at least one vectorized document in the vectorized database based on the relevant token; and
    populating the enhanced context with the at least one vectorized document and the set of relevant documents.

8. A non-transitory computer readable medium comprising computer readable program code, which when executed by a computer processor enables the computer processor to perform a method for managing user queries, the method comprising:
    obtaining, by a data system and from a client device, a user query;
    in response to obtaining the user query:
        identifying a state of the user query, wherein the state is based on whether the user query is associated with a previous user query;
        making a determination, based on the state, that the user query indicates an enhanced context generation;
        in response to the determination, performing a semantic search on a vectorized database to obtain a set of relevant documents;
        performing an enhanced search on the set of relevant documents using a knowledge graph to obtain enhanced context;
        embedding the enhanced context to the user query to obtain a finalized prompt;
        applying the finalized prompt to a large language model (LLM) of the data system to obtain a finalized result; and
        providing the finalized result to the client device.

9. The non-transitory computer readable medium of claim 8, the method further comprising:
    prior to obtaining the user query: obtaining, from a data source, a source document;
    performing a chunking on the source document to obtain a set of source chunks;
    applying a vectorization on each of the set of source chunks to obtain a set of vectorized documents, wherein the set of vectorized documents comprise the set of relevant documents; and storing the set of vectorized documents in the vectorized database.

10. The non-transitory computer readable medium of claim 8, wherein performing the semantic search comprises:
performing a vectorization of the user query to obtain a vectorized query;
calculating a relationship value for the vectorized query to each vectorized document in the vectorized database;
ranking each vectorized document in the vectorized database based on a corresponding relationship value; and
based on the ranking, identifying the set of relevant documents.

11. The non-transitory computer readable medium of claim 8, the method further comprising:
obtaining, by the data system and from the client device, a second user query, wherein the second user query is associated with the user query;
in response to obtaining the second user query:
identifying a second state of the second user query, wherein the second state indicates that the second user query is associated with the user query;
making a second determination, based on the second state, that the second user query does not indicate the enhanced context generation;
based on the second determination, applying the user query to the large language model to obtain a second response; and
providing the second response to the client device.

12. The non-transitory computer readable medium of claim 11,
wherein the determination and the second determination are made using a policy manager of the data system, and
wherein the policy manager is updated based on a reinforcement learning associated with the response, the second response, and using feedback obtained from the client device.

13. The non-transitory computer readable medium of claim 8, wherein the knowledge graph represents relationships between tokens in the set of relevant documents, and wherein each of the tokens is a concept in the vectorized database.

14. The non-transitory computer readable medium of claim 13, wherein the enhanced search comprises:
identifying a portion of the tokens in the set of relevant documents;
identifying a relevant token of the knowledge graph related to one token in the portion of the tokens; and
selecting at least one vectorized document in the vectorized database based on the relevant token; and
populating the enhanced context with the at least one vectorized document and the set of relevant documents.

15. A system comprising:
a data system operating on a processor; and
memory comprising instructions, which when executed by the processor, perform a method comprising:
obtaining, by a data system and from a client device, a user query;
in response to obtaining the user query:
identifying a state of the user query, wherein the state is based on whether the user query is associated with a previous user query;
making a determination, based on the state, that the user query indicates an enhanced context generation;
in response to the determination, performing a semantic search on a vectorized database to obtain a set of relevant documents;

performing an enhanced search on the set of relevant documents using a knowledge graph to obtain enhanced context;
embedding the enhanced context to the user query to obtain a finalized prompt;
applying the finalized prompt to a large language model (LLM) of the data system to obtain a finalized result; and
providing the finalized result to the client device.

16. The system of claim 15, the method further comprising:
prior to obtaining the user query: obtaining, from a data source, a source document;
performing a chunking on the source document to obtain a set of source chunks;
applying a vectorization on each of the set of source chunks to obtain a set of vectorized documents, wherein the set of vectorized documents comprise the set of relevant documents; and
storing the set of vectorized documents in the vectorized database.

17. The system of claim 15, wherein performing the semantic search comprises:
performing a vectorization of the user query to obtain a vectorized query;
calculating a relationship value for the vectorized query to each vectorized document in the vectorized database;
ranking each vectorized document in the vectorized database based on a corresponding relationship value; and
based on the ranking, identifying the set of relevant documents.

18. The system of claim 15, further comprising:
obtaining, by the data system and from the client device, a second user query, wherein the second user query is associated with the user query;
in response to obtaining the second user query:
identifying a second state of the second user query, wherein the second state indicates that the second user query is associated with the user query;
making a second determination, based on the second state, that the second user query does not indicate the enhanced context generation;
based on the second determination, applying the user query to the large language model to obtain a second response; and
providing the second response to the client device.

19. The system of claim 18,
wherein the determination and the second determination are made using a policy manager of the data system, and
wherein the policy manager is updated based on a reinforcement learning associated with the response, the second response, and using feedback obtained from the client device.

20. The system of claim 15,
wherein the knowledge graph represents relationships between tokens in the set of relevant documents, and
wherein each of the tokens is a concept in the vectorized database, and
wherein the enhanced search comprises:
identifying a portion of the tokens in the set of relevant documents;
identifying a relevant token of the knowledge graph related to one token in the portion of the tokens; and
selecting at least one vectorized document in the vectorized database based on the relevant token; and populating the enhanced context with the at least one vectorized document and the set of relevant documents.

\* \* \* \* \*